Patented Oct. 11, 1927.

1,645,265

UNITED STATES PATENT OFFICE.

HEINRICH von HOCHSTETTER, OF KONSTANZ, GERMANY, ASSIGNOR TO THE FIRM HOLZVERKOHLUNGSINDUSTRIE AKTIENGESELLSCHAFT, OF KONSTANZ, GERMANY.

MAKING ANHYDROUS SALTS OF FATTY ACIDS.

No Drawing. Application filed December 7, 1926, Serial No. 153,215, and in Germany December 18, 1925.

This invention relates to the manufacture of anhydrous salts of the lower members of the fatty acid series for example sodium acetate, which is a much used product in chemical industry.

Until now anhydrous sodium acetate, which for many purposes must have a high degree of purity, was manufactured either by converting chemically pure acetic acid with pure sodium carbonate to sodium acetate containing crystal water and removing the crystal water by melting or by neutralization of an impure acetic acid for example pyroligneous acid with sodium carbonate and purification of the obtained, very impure salt by repeated crystallizations and meltings. Both these methods are not only complicated but also expensive.

According to the invention anhydrous salts of fatty acids are obtained without melting and crystallization processes by reacting anhydrous esters of the respective fatty acid with anhydrous metal hydroxides in presence of organic solvents. As impure and diluted fatty acids, for example, acetic acid can easily be converted to esters and these are easily purified for example by simple rectifying, the process according to the invention discloses an excellent method for the conversion of these diluted acids, which are often obtained in industrial chemistry, into first class anhydrous salts of the respective acids.

In carrying out the process according to the invention an ester of a fatty acid such as acetic acid methyl ester, obtained by the usual methods for example by esterification of crude pyroligneous acid and following rectification, may be reacted with a molecular amount of anhydrous sodium hydroxide in presence of an organic solvent such as alcohol, the reactants being thoroughly mixed during the reaction. The products of this reaction are anhydrous sodium acetate and methyl alcohol, both products having a degree of purity, which until now scarcely was reached in industrial chemistry. The sodium acetate is obtained in form of fine crystals, which is another advantage of the invention, as this form of the acetate is for many industrial purposes better than the usual commercial molten sodium acetate. Thus for example the molten acetate of sodium used for the manufacture of acetic acid anhydride must first be ground and eventually dried at reduced pressure, whereas the product made according to the method of the invention may be used as obtained.

*Example.*

Molecular amounts of acetic acid ethyl ester and sodium hydroxide dissolved in ethyl alcohol preferably anhydrous ethyl alcohol are mixed by stirring in a stirring apparatus provided with a reflux condenser. The stirring is stopped when a sample shows the end of the reaction. The crystalline mash obtained consists of anhydrous sodium acetate and ethyl alcohol, the latter being removed for example by centrifugalization or distillation. The obtained, pure white, anhydrous sodium acetate fulfills the highest requirements of the chemical industry.

It is known that esters may be saponified by watery alkali metal hydroxides. But it was not to be expected that this saponification could also be carried out with anhydrous alkali metal hydroxides thereby obtaining the above named valuable products. Such a result was the more unexpected as it was believed that salts of acetic acid could be produced only in presence of water. According to Ullmann, Enzyklopädie der technischen Chemie, volume 5, page 10, lines 4–7 anhydrous acetic acid does not react with sodium carbonate. It is therefore surprising that the acetic acid component of an ester reacts with anhydrous metal hydroxides, salts being produced.

The method as described in the example given for the manufacture of acetates may also be employed for the manufacture of anhydrous salts of other fatty acids, using cheap diluted acids to start with and obtaining valuable pure salts and alcohols.

I claim:

1. A method for making anhydrous salts of the lower members of the fatty acid series which consists in reacting anhydrous esters of the fatty acids with anhydrous metal hydroxides in presence of organic solvents.

2. A method for making anhydrous salts of the lower members of the fatty acid series which consists in reacting anhydrous esters of the fatty acids with anhydrous metal hydroxides dissolved in alcohols.

3. A method for making anhydrous acetates which consists in reacting anhydrous esters of acetic acid with anhydrous metal hydroxides in presence of organic solvents.

4. A method for making anhydrous acetates which consists in reacting anhydrous esters of acetic acid with anhydrous metal hydroxides dissolved in alcohols.

5. A method for making anhydrous sodium acetate which consists in reacting an anhydrous ester of acetic acid with anhydrous sodium hydroxide in presence of an organic solvent.

6. A method for making anhydrous sodium acetate which consists in reacting an anhydrous ester of acetic acid with anhydrous sodium hydroxide dissolved in alcohol.

7. A method for making anhydrous sodium acetate which consists in reacting anhydrous acetic acid ethyl ester with anhydrous sodium hydroxide dissolved in ethyl alcohol, the reacting mixture being stirred during the reaction.

In testimony whereof I affix my signature.

Dr. HEINRICH von HOCHSTETTER.